US008504762B2

(12) United States Patent
Matsumoto et al.

(10) Patent No.: US 8,504,762 B2
(45) Date of Patent: *Aug. 6, 2013

(54) FLASH MEMORY STORAGE DEVICE WITH DATA INTERFACE

(75) Inventors: Masahiro Matsumoto, Toyota (JP); Takayuki Okinaga, Hannou (JP); Shuichiro Azuma, Tokyo (JP); Shigeru Takemura, Yokohama (JP); Yasuyuki Koike, Hachioji (JP); Kazuki Makuni, Akishima (JP)

(73) Assignee: Hitachi ULSI Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,132

(22) Filed: Jun. 1, 2012

(65) Prior Publication Data

US 2012/0239865 A1 Sep. 20, 2012

Related U.S. Application Data

(63) Continuation of application No. 12/376,665, filed as application No. PCT/JP2007/063363 on Jul. 4, 2007, now Pat. No. 8,205,034.

(30) Foreign Application Priority Data

Aug. 9, 2006 (JP) .................................. 2006-217436

(51) Int. Cl.
*G06F 12/00* (2006.01)
*G06F 13/00* (2006.01)
*G06F 13/28* (2006.01)

(52) U.S. Cl.
USPC .............. 711/103; 711/154; 711/202; 714/22

(58) Field of Classification Search
USPC ........................................................ 711/103
See application file for complete search history.

(56) References Cited

U.S. PATENT DOCUMENTS

| 5,873,112 A | 2/1999 | Norman |
| 6,646,931 B2 | 11/2003 | Mizoguchi et al. |
| 2002/0069317 A1* | 6/2002 | Chow et al. .................. 711/104 |

(Continued)

FOREIGN PATENT DOCUMENTS

| JP | 07-044468 | 2/1995 |
| JP | 2000-076148 | 3/2000 |
| JP | 2001-125659 | 5/2001 |
| JP | 2003-085054 | 3/2003 |
| JP | 2006-195736 | 7/2006 |

*Primary Examiner* — Christian P Chace
*Assistant Examiner* — Prasith Thammavong
(74) *Attorney, Agent, or Firm* — Mattingly & Malur, PC

(57) ABSTRACT

A storage device realizing an improvement in rewrite endurance of a nonvolatile memory and an improvement in data transfer rate of write and read operations is provided including a nonvolatile memory; a volatile memory for storing file management information of the nonvolatile memory; a controller for controlling the nonvolatile memory and the volatile memory; and a power supply maintaining unit for supplying power to the nonvolatile memory, the volatile memory, or the controller upon power shutdown. The controller reads the file management information in the nonvolatile memory upon power-on and writes the same in the volatile memory, and read and write operations are performed based on the file management information in the volatile memory, and the file management information in the volatile memory is written in the nonvolatile memory upon power shutdown.

2 Claims, 14 Drawing Sheets

U.S. PATENT DOCUMENTS

| | | | |
|---|---|---|---|
| 2003/0088575 A1* | 5/2003 | Gould et al. | 707/102 |
| 2005/0225406 A1 | 10/2005 | Miura et al. | |
| 2005/0251617 A1 | 11/2005 | Sinclair et al. | |
| 2006/0015683 A1 | 1/2006 | Ashmore et al. | |
| 2006/0080515 A1 | 4/2006 | Spiers et al. | |
| 2007/0033431 A1 | 2/2007 | Pecone et al. | |

* cited by examiner

INSERT PROJECTION TO BOSS HOLE

FIX SPACER AND BOARD BY BOLT AND NUT

FLASH MEMORY STORAGE DEVICE WITH DATA INTERFACE

CROSS-REFERENCES

This application is a continuation application of U.S. Ser. No. 12/376,665, filed Feb. 6, 2009, which application is a National Stage Entry (371) of PCT/JP2007/063363, filed Jul. 4, 2007, the entire contents of which are hereby incorporated by reference. This application claims priority to JP 2006-217436, filed Aug. 9, 2006.

TECHNICAL FIELD

The present invention relates to a storage device, and it relates to a technique effective to be used for a storage device configured with using, for example, a flash memory and used as a file memory.

BACKGROUND ART

A storage device including a file memory having a storage capacity for a plurality of pages by using a flash memory is disclosed in Patent Document 1.
Patent Document 1: Japanese Patent Application Laid-Open Publication No. 7-44468

DISCLOSURE OF THE INVENTION

Problems to be Solved by the Invention

It has been discovered that there is a problem in rewrite endurance of semiconductor nonvolatile memories in a study of introducing commercial production of FMDs (Flash Memory Drive) using semiconductor nonvolatile memories, such as flash memory, as a storage medium for a replacement product for hard disk drives (hereinafter, referred to as "HDDs") which have been currently used as storage devices for consumer appliances and embedded devices for industrial application. That is, the semiconductor nonvolatile memories like flash memory have a limited number of rewrite operations, and upon an investigation on addresses having a specific memory area frequently accessed to perform rewritings when used for a file as memory mentioned above, it has been found that rewritings are concentrated on file management information such as PBR (Partition Boot Record), and FAT1, FAT2 and DIR (Directory) in the case of a FAT (File Allocation Table) system. Similarly, it has become clear that rewritings are concentrated on file management information in other types of operating systems as well.

Moreover, among storage devices, the number of accesses in a lifetime of a magnetic head of an HDD is approximately 300 thousand cycles, and that of a flash memory (NAND type and AND type) is 100 to 300 hundred cycles per block, so both have a limited lifetime. And, lifetimes of the storage devices depend on lifetimes of their storage units.

Thus, the storage devices have a problem in lifetime caused by deterioration from accesses to the storage unit, and the maximum of the lifetime of the storage unit is determined by the deterioration. Especially, NAND flash memories with a large block size for writing have a plurality of data items smaller than the write block size; therefore, the memories reach to the end of their lifetimes in a short period of time when writes frequently take place. Especially, rewrites frequently take place in file management sections of the operating systems, and as the latest operating systems frequently write position information in order to track history even in the case of a failure, the lifetimes of the storage devices become extremely short.

Accordingly, it is an object of the present invention to provide a storage device realizing an improvement in rewrite endurance of nonvolatile memories and an improvement in data transfer rate of writing and reading.

The above and other objects and novel characteristics of the present invention will be apparent from the description of the present specification and the accompanying drawings.

Means for Solving the Problems

Typical ones of the inventions disclosed in the present application will be briefly described as follows.

More particularly, a storage device according to the present invention includes: a nonvolatile memory provided with a file management information section and a data section; a volatile memory for storing file management information of the nonvolatile memory; a controller for controlling the nonvolatile memory and the volatile memory; and a power supply maintaining unit for supplying power to the nonvolatile memory, the volatile memory, or the controller when the power is shut down, where the controller reads the file management information in the file management information section in the nonvolatile memory to write the same in the volatile memory upon power start-up; the controller performs read and write based on the file management information in the volatile memory for a read operation and a write operation to the nonvolatile memory; and the controller reads the file management information in the volatile memory to write the same in the nonvolatile memory upon power shutdown.

Effects of the Invention

The effects obtained by typical aspects of the present invention will be briefly described below.

A storage device realizing an improvement in rewrite endurance of nonvolatile memories and an improvement in data transfer rate of writing and reading can be realized.

BRIEF DESCRIPTIONS OF THE DRAWINGS

BEST MODE FOR CARRYING OUT THE INVENTION

Hereinafter, an embodiment of the present invention will be described in detail with reference to the accompanying drawings. Note that, components having the same function are denoted by the same reference symbols throughout the drawings for describing the embodiment, and the repetitive description thereof will be omitted.

(Schematic Configuration)

Figure 1:
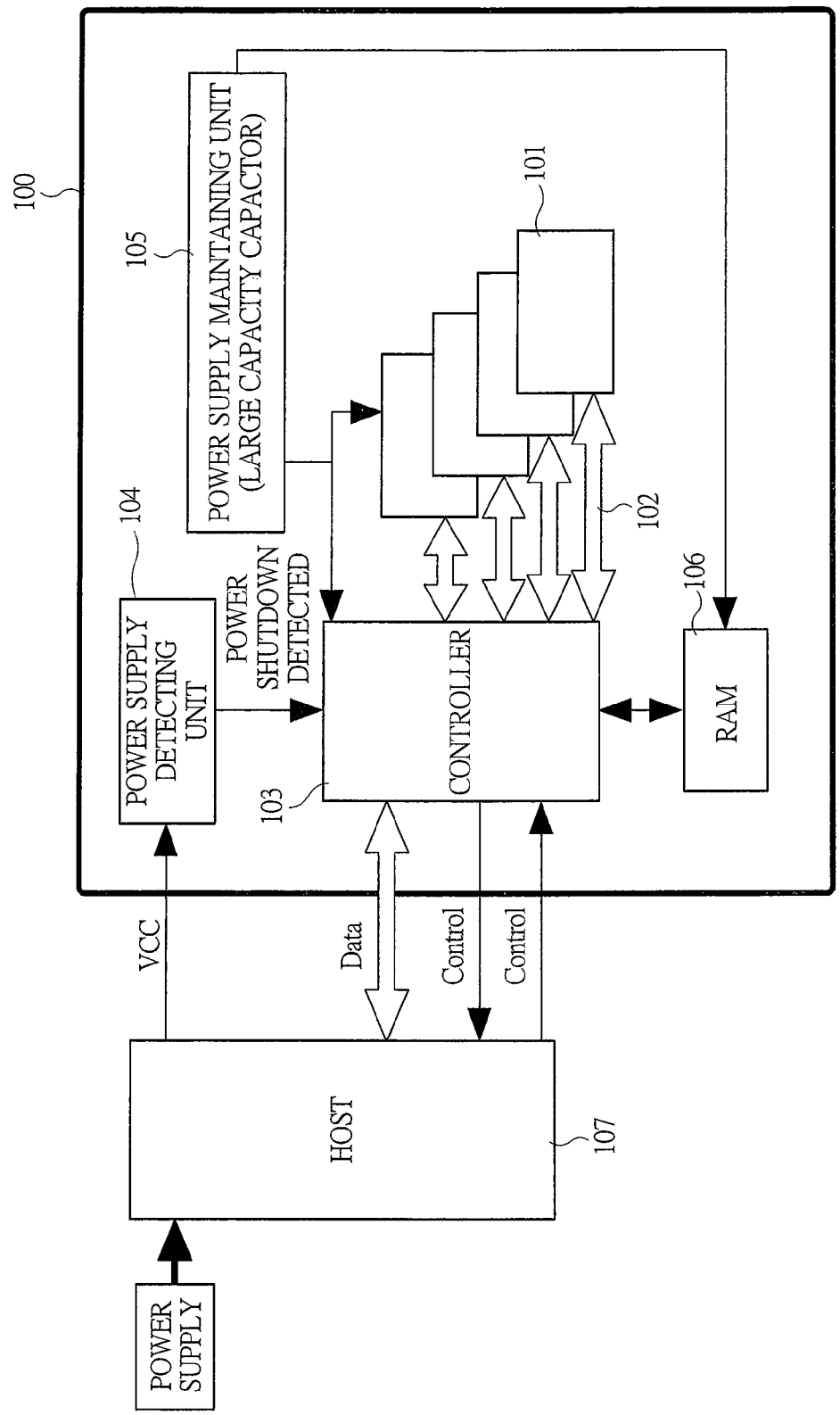
FIG. 1 is a block diagram illustrating a schematic configuration of a storage device according to an embodiment of the present invention.

FIG. 1 is a block diagram showing a schematic configuration of a storage device according to an embodiment of the present invention.

First, with reference to FIG. 1, an example of a configuration of the storage device according to the present embodiment will be described. The storage device of the present embodiment is an HDD compatible storage device (Flash Memory Drive: FMD) 100, for example, and, although not limited to this, the storage device is configured to have a plurality of pieces, such as 32 or 64 pieces, of nonvolatile memory (flash memory, etc.) 101, each piece having a storage capacity of 512 Megabits (Mbits) in one package so as to form a file memory having a storage capacity for a plurality of pages. Accordingly, a flash memory drive configured with 32 pieces has a storage capacity in total of 16,384 Mbits (512× 32) or 16 Gigabits (Gbits), and 32,768 Mbits (512×64) or 32 Gbits in the case of 64 pieces.

The nonvolatile memories 101 are connected to internal buses 102 via nonvolatile memory interfaces (IFs) (not shown). The internal buses 102 are connected to a controller 103.

The controller 103 has a control section such as a one-chip microcomputer and an interface such as an ATA (AT Attachment) or SCSI (Small Computer System Interface). Therefore, data exchange, that is, writes and reads of data between a driver provided in the interface and the nonvolatile memories 101 is performed by the controller 103.

In this embodiment, the above-described package further includes: a power supply detecting unit 104 for detecting power shutdown; a power supply maintaining unit 105 including a large capacity capacitor, a switch, etc. for securing an operating voltage when the power is shut down; and a volatile memory (DRAM, SRAM, etc.) 106. The large capacity capacitor in the power supply maintaining unit 105 uses its stored charge to supply a voltage to the nonvolatile memories 101, the controller 103, the volatile memory 106, and the power supply detecting unit 104 even when unexpected power shutdown is caused to the system side, and operates to maintain the operating voltage until a state allowing normal termination of the nonvolatile memories 101. As the large capacity capacitor, for example, an electric double-layer capacitor and the like are used. In addition, a rechargeable battery, etc. may be used instead of the large capacity capacitor in the power supply maintaining unit 105.

In the nonvolatile memories 101, if there is performed power shutdown on the system side by a power failure, an operation, or a mishandling in the midst of writing, the write operation will be interrupted. Generally, since file format data stored in the storage device is stored with codes for error detection and correction added to a part of a block of data for detection and correction of error bits, if the write operation is interrupted, there will be generated data including both old and new data and the codes for error detection and correction will match neither the old nor new data, and reading this data will always cause an error that results in destruction of the data. A similar error will also occur if erasure is left uncompleted during an erase operation.

In addition, if the operating voltage falls due to power shutdown in the midst of write to a certain page and the write operation is not completely performed, such a disadvantage occurs that the write to the page is misjudged to be impossible and the page is registered as a defective page, which is substantially judged to be a device failure. The large capacity capacitor has a relatively large capacitance value of, for example, about 0.1 F, in order to prevent the malfunctions as described above and maintain the operating voltage always allowing normal termination to be performed in the nonvolatile memories 101.

The power supply detecting unit 104 receives a supply voltage VCC from a host 107 side such as a microcomputer, and detects start-up and shutdown of the power.

If an unexpected power shutdown, etc. occurs in the system, the power supply detecting unit 104, as described above, as well as the operating voltages are maintained for the controller 103 and the nonvolatile memories 101 from the large capacity capacitor in the power supply maintaining unit 105 to prevent backflow, the interface circuit in the controller 103 is controlled not to respond to a signal from the system, and the write operation is continued if it is in the midst of a write operation to maintain the signal state before the power shutdown, thereby terminating the write operation normally. In the same manner, even in the midst of erasure, the erase operation is continued, thereby allowing the erase operation to be normally terminated.

The storage device 100 is installed in a package having, for example, an outer size the same as a 2.5 inch hard disk drive apparatus (70.0×100.0×9.5 mm) or an outer size the same as a 3.5 inch hard disk drive apparatus (101.6×146.0×25.4 mm), and connector pins to be connected to the interface circuit in the controller 103 are also the same as those used for the 2.5 inch hard disk drive apparatus or the 3.5 inch hard disk drive apparatus. Therefore, the storage device 100 of this embodiment is taken as an HDD (Hard Disk Drive) compatible storage device.

Also, in this embodiment, attention is paid to the fact that the semiconductor nonvolatile memories 101 such as flash memories have a limited number of rewrite operations and the fact that, when used for a file memory as described above, the number of generated rewrites is concentrated in the area to which the file management information is assigned, for example, in FAT1, FAT2, and DIR in the case of a PBR or FAT system as mentioned above, and the volatile memory (RAM) 106 is used to prevent the limitation of the number of rewrites from being generated in a specific area in the semiconductor nonvolatile memories 101.

Figure 2:
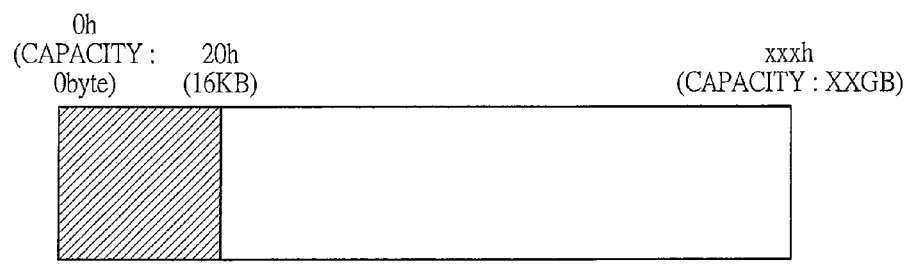
FIG. 2 is a memory map diagram illustrating an address space of the storage device according to the embodiment of the present invention.

Upon power-on, data in an address expanded in the nonvolatile memories 101 and which is visible from the host 107 is loaded to the volatile memory by an area at a predetermined address from an initial address of the volatile memory 106. That is, as shown in FIG. 2, when there is given a storage capacity of XX GB (gigabit) from 0 h to xxxh assigned to the nonvolatile memory, the area from the initial address 0 h to 20 h (16 KB) is used as the area where the file management information is recorded.

Figure 3:
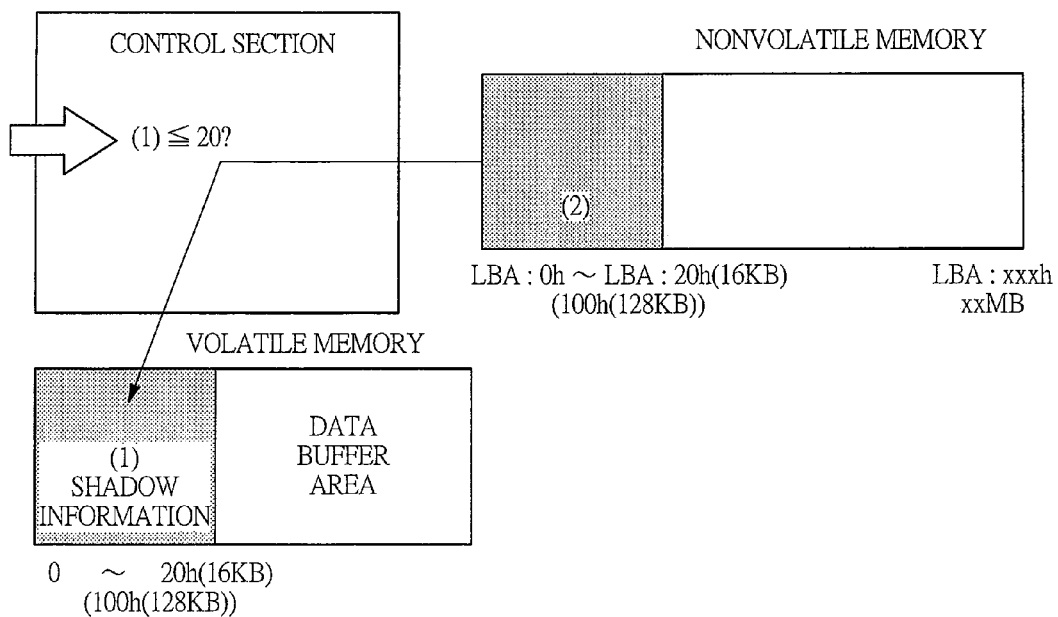
FIG. 3 is an explanatory diagram of a memory operation of the storage device according to the embodiment of the present invention.

And, as shown in FIG. 3, when power-on is detected, the data in the area from the initial address such as the above-mentioned 0 h to 20 h (16 KB) in the nonvolatile memories 101, i.e., the file management information (2) is read and written in, for example, the area from the initial address such as 0 h to 20 h in the volatile memory 106. The data (1) written in the area from the initial address to 20 h (16 KB) in the volatile memory 106 is, so to speak, shadow information with the data (2) reflected as is. Moreover, a memory area over 20 h in the volatile memory 106 is used as data buffer areas. The volatile memory 106 may be a static RAM or a dynamic RAM.

And, when write and read are performed in the nonvolatile memory 101 from the host by the power supply, the read and write of the file management information use the shadow information (1) in the volatile memory 106 instead of using the file management information (2) in the nonvolatile memories 101 for writing or reading data. At this time, when the address (1) of data inputted from the host 107 is ≦20 h, the controller 103 determines that the data is file management information, a memory access is performed to the area from the initial address to 20 h in the volatile memory 106, thereby performing an update of the shadow information (1).

Here, "file system" means a system to manage data recorded in storage devices, and software used for management and management information including management area, etc. provided in the storage medium may be also referred to as a file system. Defined are how to create files and folders (directory) in a storage device and to move and delete data, a format for recording data, and locations of and methods to use management areas. Normally, a file system is provided as one of the functions an OS (operating system) has, and each OS uses a different file system. For example, FAT (File Allocation Table) is a standard file system used for OSs from MS-DOS to Windows (registered trademark) Me, which manages a physical arrangement on a disk of clusters configuring files. For example, FAT32 can handle disks of not less than 2 GB. In order to provide compatibility with the hard disks as described above, the nonvolatile memories 101 are also applied with the same file system as described above.

when the power is shut down, the data (1) in the volatile memory 106 is replaced to be the file management information (2) in the nonvolatile memories 101. That is, the data (1) in the volatile memory 106 is read and it is rewritten as the data (2) in the nonvolatile memories 101. In order to perform such a rewrite operation, the data which has been recorded in the nonvolatile memories 101 upon power-on is erased once, and the shadow information (1) which has been retained in the volatile memory 106 before the power is shut down is written to the nonvolatile memories 101 as the file management information (2). By adopting the memory access method as described above, the file management information in the file memory of the present application is updated using the volatile memory 106 in each memory access, and the information is transmitted to the nonvolatile memories 101 before the power is shut down, thereby retaining it as nonvolatile data.

In this manner, by maintaining the file management information in the volatile memory, at the time of usual read (read time) and update (write time), a rewrite (erase, write) of the file management information is not generated in the nonvolatile memories each time; therefore, the limit of the number of rewrite cycles will not be reached. Moreover, since the read and rewrite (update) of the management information are performed using the volatile memory, reading time and writing are shortened compared to a memory access time to the nonvolatile memories 101 via the internal bus 102 and the nonvolatile memory interface (not shown), thereby enabling a faster memory access as a storage device. In addition, at the time of data write, the number of write cycles to the nonvolatile memory can be reduced, or waiting time due to write is eliminated, thereby improving performance of the system.

Basically, as described above, the file management information is transmitted between the nonvolatile memories 101 and the volatile memory 106 upon power-on and power shutdown. Other than that, according to a control signal inputted via a control line from the host 107, the updated file management information in the volatile memory may be forwarded to the nonvolatile memories 101. For example, upon power cutoff of the system, it can be used in the case where the file management information is forwarded from the volatile memory 106 to the nonvolatile memories 101 to make the information nonvolatile before cutting off the power. Alternatively, the control signal may be generated at regular time intervals to forward the file management information from the volatile memory 106 to the nonvolatile memories 101 to perform update of the information. In this case, if there is no update of the file management information when the power is shut down, the power can be directly shut down.

As described above, when the power is shut down due to a power failure, an operation, or a mishandling on the system, in the operation to normally and stably terminate the nonvolatile memories 101 using the power supply detecting unit 104 and the power supply maintaining unit 105 including the large capacity capacitor, the operation for forwarding the updated file management information in the volatile memory 106 to the nonvolatile memories 101 and recoding the same is included. Thereby, reliability of the nonvolatile memories 101 can be ensured. Moreover, the large capacity capacitor may be omitted also. That is, since operating voltages (VDD)

of the nonvolatile memories 101 and the volatile memory 106 are low in the system, it is possible that the nonvolatile memories 101 are normally terminated and also the file management information is forwarded to the nonvolatile memories 101 using the time period from cutting off the power (VCC) of the system until reaching lower limit voltages for the operation of the nonvolatile memories 101 and the volatile memory 106.

Since the file management information frequently rewritten is expanded in the volatile memory, the number of rewrite cycles of the nonvolatile memories can be reduced, thereby reducing the number of write cycles, and therefore enabling elongation of lifetime of devices. Moreover, since the file management information frequently accessed is exchanged with the volatile memory, system performance can be improved.

(Detection of Deterioration of Large Capacity Capacitor)

Figure 4:
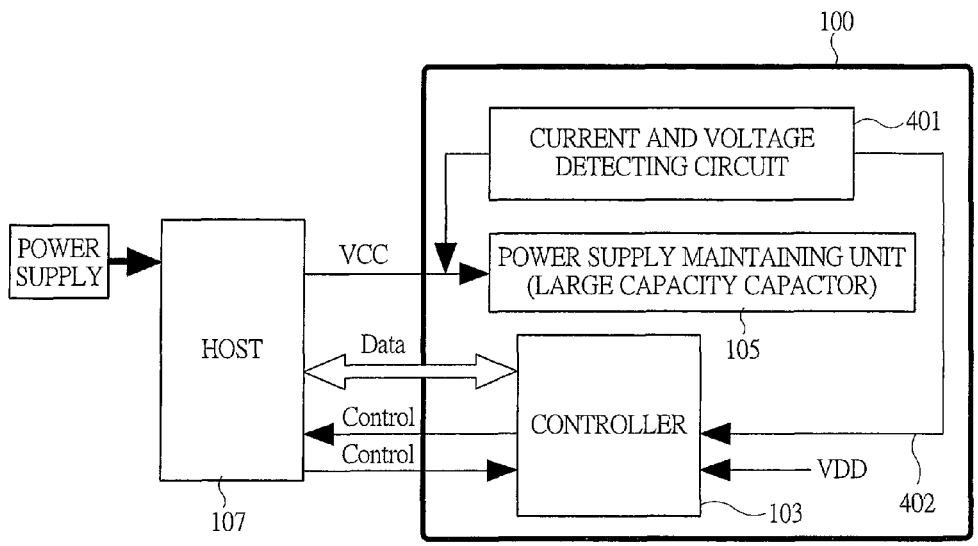
FIG. 4 is a block diagram illustrating a schematic configuration of a circuit for detecting deterioration of a large capacity capacitor in the storage device according to the embodiment of the present invention.

FIG. 4 is a block diagram illustrating a schematic configuration of a circuit for detecting deterioration of the large capacity capacitor in the storage device according to the embodiment of the present invention. Note that, in FIG. 1, VCC is a supply voltage supplied from outside and has a voltage value of, for example, 5 V. VDD is an internal supply voltage inside the storage device and has a voltage value of, for example, 3.5 V.

A current and voltage detecting circuit 401 monitors the amount of current and voltage flowing into the large capacity capacitor in the power supply maintaining unit 105 to detect a remaining capacity of the large capacity capacitor. By the monitoring of the current and voltage detecting circuit 401, failure modes such as capacity lowering and short circuiting caused by deterioration of the capacitor are detected. The current and voltage detecting circuit 401 uses a so-called gage IC, etc. that outputs the voltage value by digital values to calculate a fluctuation, etc. of the voltage in a predetermined time.

As a method of detecting the deterioration of the large capacity capacitor, for example, upon power-on and power shutdown, determination is made according to (1) an enlargement of the potential difference or (2) no current flow. When a deterioration of the large capacity capacitor is detected, the current and voltage detecting circuit 401 outputs a detection signal 402 to the controller 103. After receiving the signal, the controller 103 switches to a mode not to store data in the volatile memory 106.

Moreover, other than the time to turn on or shut down the power, a reset signal may be sent to the nonvolatile memories 101 to generate sudden power consumption in order to cause the same determination as (1) and (2) described above.

Figure 5:
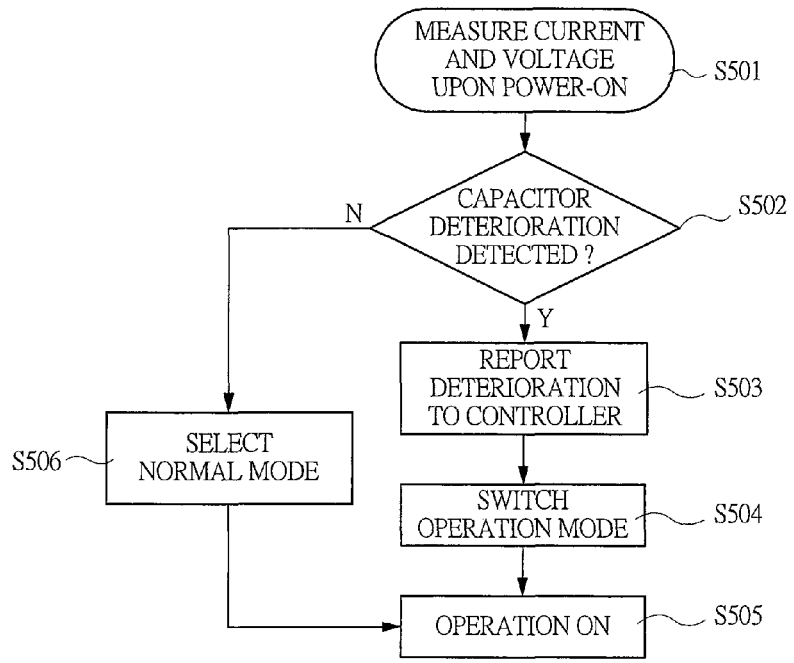
FIG. 5 is a flow chart indicating an operation of the circuit for detecting deterioration of a large capacity capacitor in the storage device according to the embodiment of the present invention.

FIG. 5 is a flowchart indicating an operation of the circuit for detecting deterioration of the large capacity capacitor. As indicated in FIG. 5, at first, the current and voltage detecting circuit 401 measures the amount of current and voltage flowing into the large capacity capacitor inside the power supply maintaining unit 105 at a step S501. If deterioration of the large capacity capacitor (capacitor) is detected at a step S502, the current and voltage detecting circuit 401 outputs the detection signal 402 to the controller 103 at a step S503 to report deterioration of the large capacity capacitor. Upon receiving the detection signal 402 of the deterioration, the controller 103 switches operational modes at a step S504. For example, the controller 103 stops storing the data in the volatile memory 106 and limits read/write. Then, the operation of the volatile memory 106 is turned on (ON) at a step S505.

If deterioration is not detected, a normal mode is selected at a step S506. Then, the operation of the volatile memory 106 is turned on (ON) at the step S505.

Figure 6:
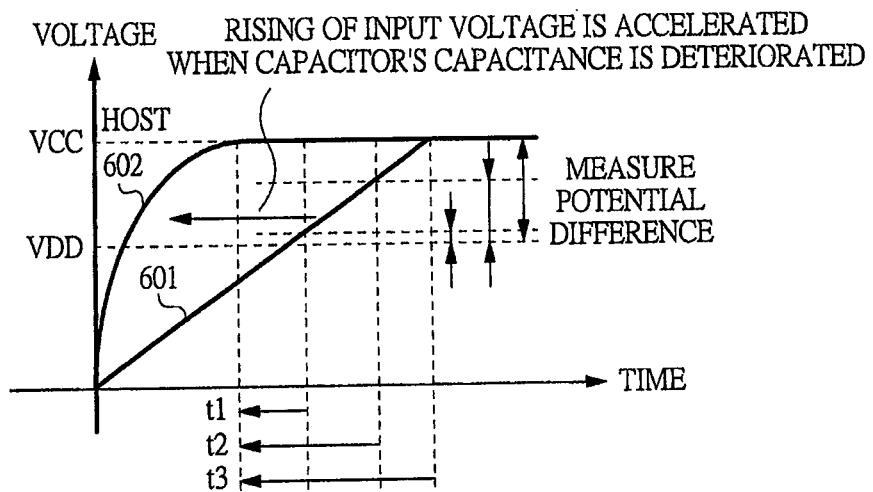
FIG. 6 is an explanatory diagram illustrating a method of determination of the circuit for detecting deterioration of a large capacity capacitor in the storage device according to the embodiment of the present invention.
Figure 7:
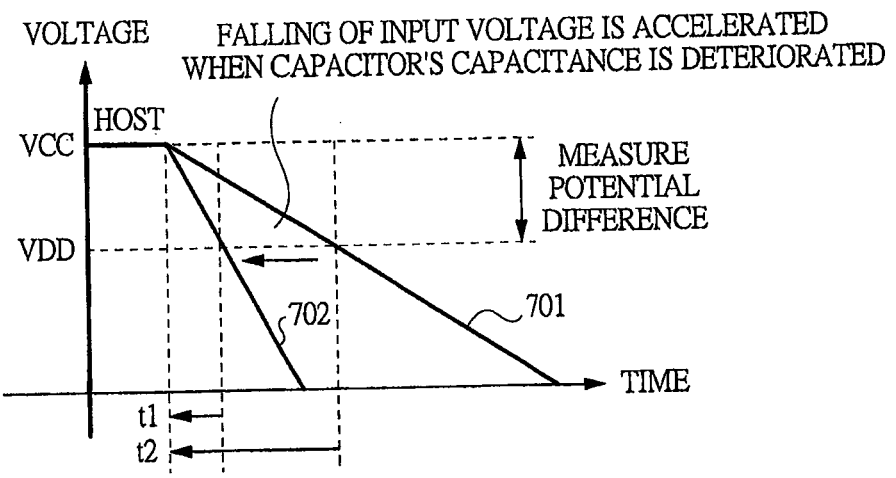
FIG. 7 is an explanatory diagram illustrating a method of determination of the circuit for detecting deterioration of a large capacity capacitor in the storage device according to the embodiment of the present invention.
Figure 8:
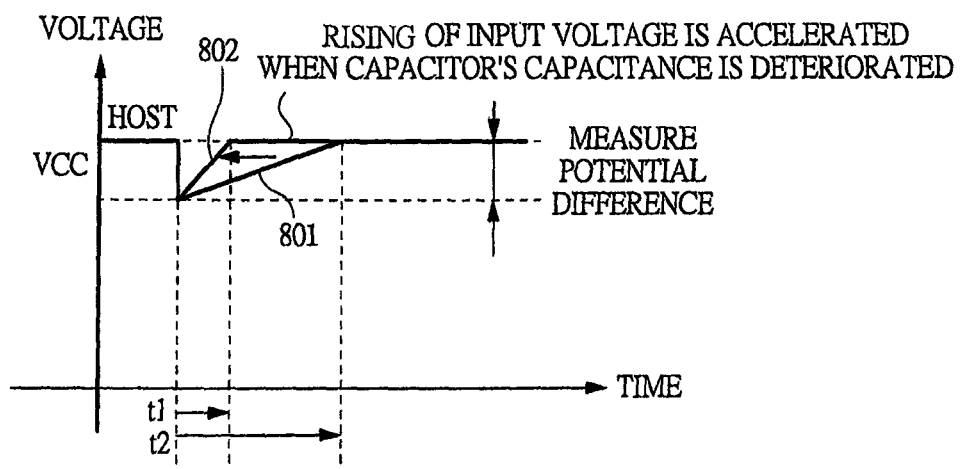
FIG. 8 is an explanatory diagram illustrating a method of determination of the circuit for detecting deterioration of a large capacity capacitor in the storage device according to the embodiment of the present invention.

FIG. 6, FIG. 7, and FIG. 8 are explanatory diagrams illustrating determination methods in the circuit for detecting deterioration of the large capacity capacitor. FIG. 6 illustrates temporal changes of the voltage of the large capacity capacitor upon power-on. In FIG. 6, a waveform 601 is a waveform in the case where the large capacity capacitor is under a normal condition, and a waveform 602 is a waveform in the case where the large capacity capacitor (hereinafter, referred to as a "capacitor") has been deteriorated. Further, t1, t2, and t3 are times indicating timings of calculating potential differences. As the capacitor deteriorates, the voltage waveform of the capacitor upon power-on changes from the waveform 601 to the waveform 602. That is, when the capacitor's capacitance is deteriorated, rising of an input voltage is accelerated. Accordingly, a potential difference from VDD is calculated at each timing of the times t1, t2, and t3 to detect deterioration of the capacitor. Alternatively, time to reach a given potential difference is derived. That is, deterioration of the capacitor is determined according to the rising time and the potential difference.

FIG. 7 illustrates temporal changes of the voltage of the large capacity capacitor upon power shutdown (OFF). In FIG. 7, a waveform 701 is a waveform in the case where the capacitor is under a normal condition, and a waveform 702 is a waveform in the case where the capacitor has been deteriorated. Moreover, t1 and t2 are times indicating timings to calculate potential differences. As the capacitor deteriorates, the voltage waveform of the capacitor upon power shutdown changes from the waveform 701 to the waveform 702. That is, as the capacitor capacitance is deteriorated, falling of the input voltage is accelerated. Accordingly, a potential difference from the VDD is calculated at each timing of the times t1 and t2 to detect deterioration of the capacitor. Alternatively, time to reach a given potential difference is calculated. That is, deterioration of the capacitor is determined according to the falling time and the potential difference. Then, information indicating that deterioration has been detected is saved in an internal memory, and the mode is shifted at the next startup.

FIG. 8 illustrates temporal changes of the voltage of the large capacity capacitor in the case where the electric power is suddenly consumed by inputting a reset signal to the nonvolatile memories upon a read/write operation to determine deterioration of the capacitor. In FIG. 8, a waveform 801 is a waveform in the case where the capacitor is under normal condition, and a waveform 802 is a waveform in the case where the capacitor has been deteriorated. Further, t1 and t2 are times indicating timings to calculate potential differences. As the capacitor deteriorates, the voltage waveform of the capacitor upon inputting the reset signal changes from the waveform 801 to the waveform 802. That is, when the capacitor capacitance is deteriorated, the recovery time of the voltage is accelerated. Accordingly, to detect deterioration of the capacitor, the potential difference with the VDD is calculated at each timing of the times t1 and t2. Alternatively, time to reach a given potential difference is calculated. That is, deterioration of the capacitor is determined according to the rising time and the potential difference.

(Emergency Power Shutdown Sequence)

Figure 9:
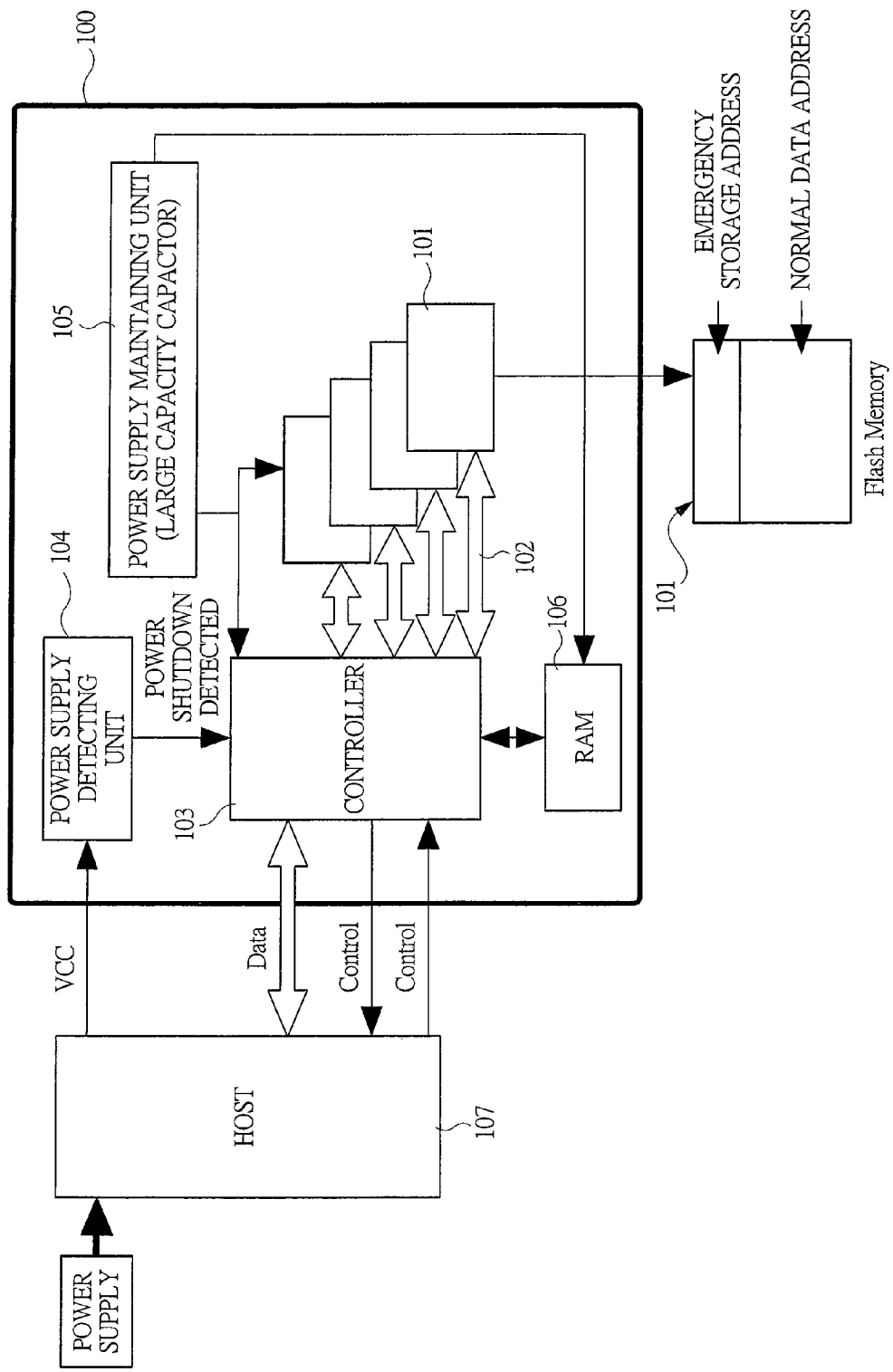
FIG. 9 is a block diagram illustrating a schematic configuration of the storage device according to the embodiment of the present invention.

FIG. 9 is a block diagram illustrating a schematic configuration of the storage device according to the embodiment of the present invention. The storage device of the present embodiment has the same structure as the one in FIG. 1, therefore detailed descriptions thereof will be omitted.

If the power from the host 107 is shut down, the device is shifted to an emergency power-off sequence for data protection. In this process, data stored in the internal volatile memory 106 is moved to the nonvolatile memories 101.

Addresses in the nonvolatile memories 101 for write destinations are determined in advance and stored in a memory. The memory to store the addresses is a memory in the controller 103, the volatile memory 106, or the nonvolatile memories 101. Data storage addresses for the emergency power shutdown (emergency storage addresses) are provided separately from addresses for general data.

In this process, to quickly process data save in parallel, the emergency storage addresses are evenly assigned to memory buses of the plurality of nonvolatile memories 101. In this manner, by fixing the emergency storage addresses and allocating destinations to save the data in an emergency to the plurality of nonvolatile memories, a process for handling overhead will become unnecessary, thereby achieving high speed processes.

Figure 10:
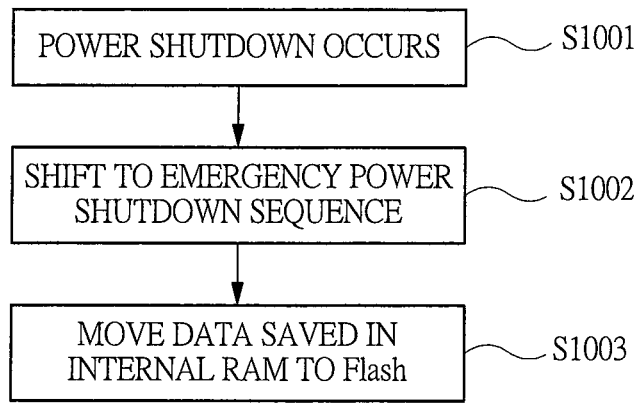
FIG. 10 is a flowchart indicating an operation of an emergency power shutdown sequence in the storage device according to the embodiment of the present invention.

FIG. 10 is a flowchart indicating an operation of the emergency power-off sequence. If unexpected power shutdown occurs at a step S1001, it is shifted to the emergency power shutdown sequence at a step S1002. At a step S1003, the data stored in an internal RAM, i.e., the volatile memory 106, is moved to a flash memory, i.e., the nonvolatile memory 101. In this process, the data is moved being distributed to predetermined emergency storage addresses in the plurality of nonvolatile memories 101.

(Power On/Off Sequence)

Upon power-on (power-on), the controller 103 moves and saves the file management information managed in a block other than the ones for data in the nonvolatile memories (flash memory) 101 to the volatile memory 106 (RAM). The file management information is managed in the volatile memory 106 when the memory is in operation, and the information is written back to the nonvolatile memories 101 upon power-off (power shutdown).

Moreover, the controller 103 also moves data expected to be frequently accessed from the nonvolatile memories 101 to the volatile memory 106 upon power-on.

Listed as the above-mentioned file management information are: (1) non-defective/defective product; (2) logical addresses; (3) in-chip addresses; (4) the number of rewrite cycles; (5) ECC information; (6) existing locations of data; and (7) defect occurrence history, etc. of corresponding sectors of the nonvolatile memories.

In this manner, the number of rewrite operations in the nonvolatile memories can be decreased and longer lifetime can be achieved by updating the file management information frequently updated described above in the volatile memory. Moreover, since the volatile memory operates faster than the nonvolatile memories, a faster processing speed can be achieved.

Figure 11:
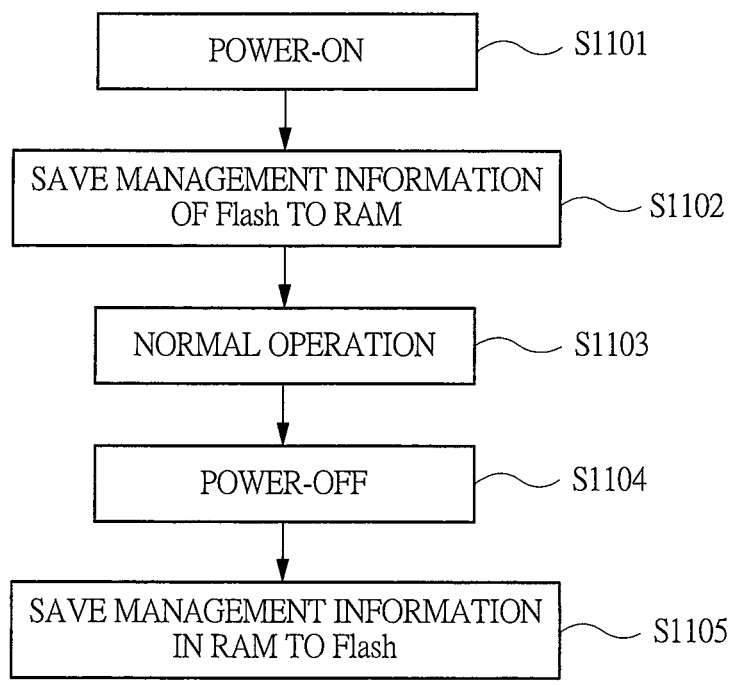
FIG. 11 is a flowchart indicating an operation of a power-on/power-off sequence in the storage device according to the embodiment of the present invention.

FIG. 11 is a flowchart indicating an operation of the power-on/power-off sequence. Upon power-on at a step S1101, the file management information in the flash, i.e., the nonvolatile memory 101, is moved to and saved in the RAM, i.e., the volatile memory 106 at a step S1102. Normal operations such as memory reading and writing are performed at a step S1103. Upon power-off, that is, when the power is shut down at a step S1104, the file management information in the RAM, i.e., the volatile memory 106 is moved to and saved in the flash, i.e., the nonvolatile memory 101, at a step S1105. Note that, upon saving the data, power is obtained from the capacitor in the power supply maintaining unit 105.

(Allocation of Data According to Write Size)

Figure 12:
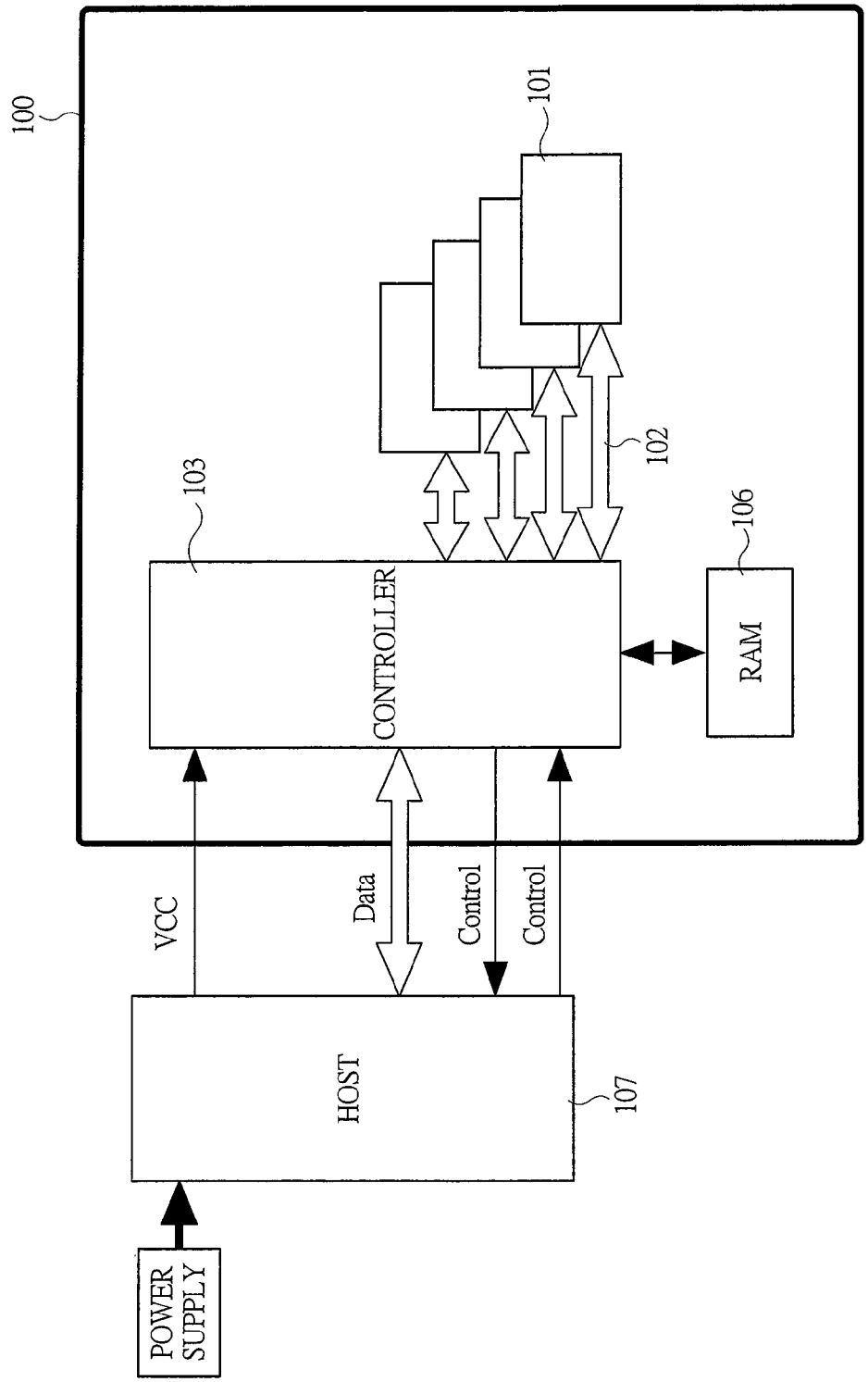
FIG. 12 is a block diagram illustrating a schematic configuration of the storage device according to the embodiment of the present invention.

FIG. 12 is a block diagram illustrating a schematic configuration of the storage device according to the embodiment of the present invention. The storage device of the present embodiment has the same structure as the one in FIG. 1, therefore detailed descriptions thereof will be omitted.

The controller 103 has a mechanism to allocate a write destination to the volatile memory 106 or the nonvolatile memories 101 when a write (write) command is generated from the host 107. The determination of the allocation by the controller 103 is performed by the following criteria.

(1) Allocation is made to the nonvolatile memories 101 when the data size is large, and to the volatile memory 106 when the data size is small. As a criterion for distinction, ½ block (1 block: 128 KB) is used for a border, for example.

(2) Allocation is made to the volatile memory 106 when the rewriting frequency of the data is high, and to the nonvolatile memories 101 when the rewriting frequency of the data is low judging from intervals for rewritings to occur, time stamps, etc.

(3) Allocation is made to the volatile memory 106 when a vacancy ratio by block unit (128 KB/how far data has been added in a block) is high, and to the nonvolatile memories 101 when the vacancy ratio is low.

Figure 13:
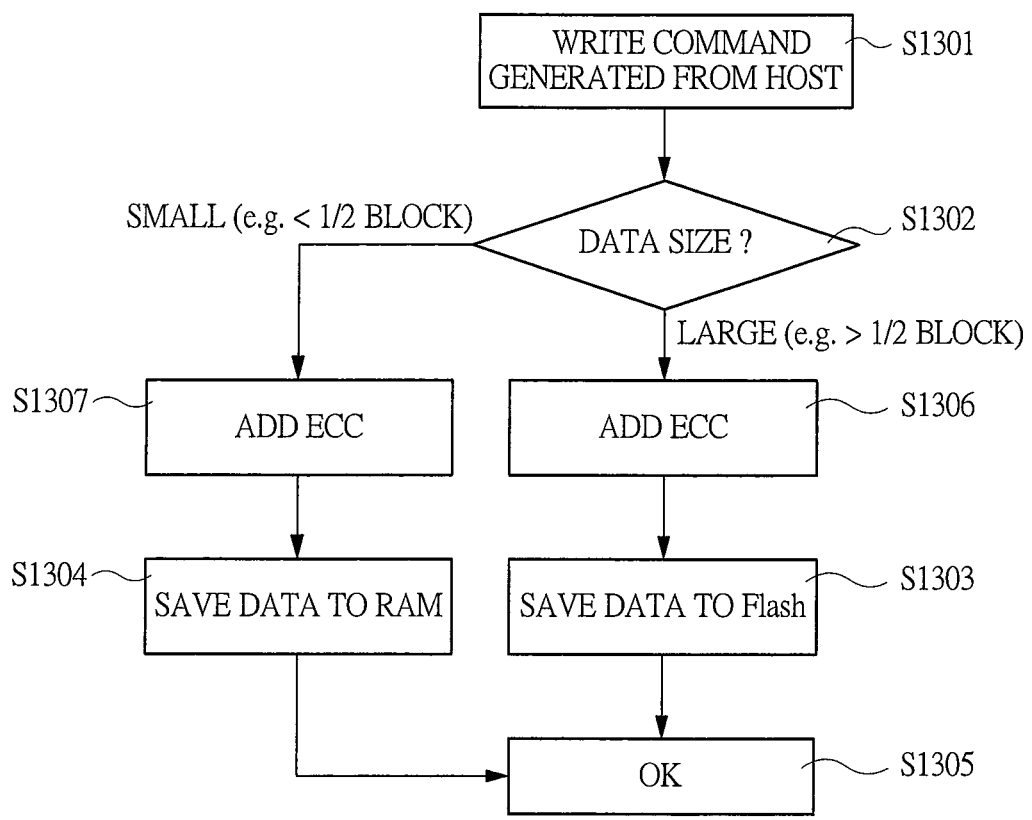
FIG. 13 is a flowchart indicating an operation of distribution by a controller in the storage device according to the embodiment of the present invention.

FIG. 13 is a flowchart indicating an operation of the allocation by the controller 103. At first, when a write command is generated in the host 107 at a step S1301, the controller 103 performs determination of the data size at a step S1302. In this process, in addition to the data size, determinations of the rewriting frequency of data, the vacancy ratio by block unit, etc. are also performed according to the above-described criteria (1) to (3). When the data size is, for example, not less than ½ block, the ECC is added at a step S1306, and then proceeding to a step S1303, the data is saved in the flash, i.e., the nonvolatile memory 101. When the data size is smaller than, for example, ½ block, the ECC is added at a step S1307 and then proceeding to a step S1304, the data is saved in the RAM, i.e., the volatile memory 106.

(Leveling Process)

The controller 103 judges the number of rewrite cycles with the file management data of the nonvolatile memories 101 saved in the RAM, i.e., the volatile memory 106, and performs an equalization process, i.e., a leveling process. That is, the data is moved between the volatile memory 106 and the nonvolatile memories 101 using the number of rewrite cycles of the data in the nonvolatile memories 101, the number of ECC correction bits, etc., and the controller 103 performs the leveling process.

Figure 14:
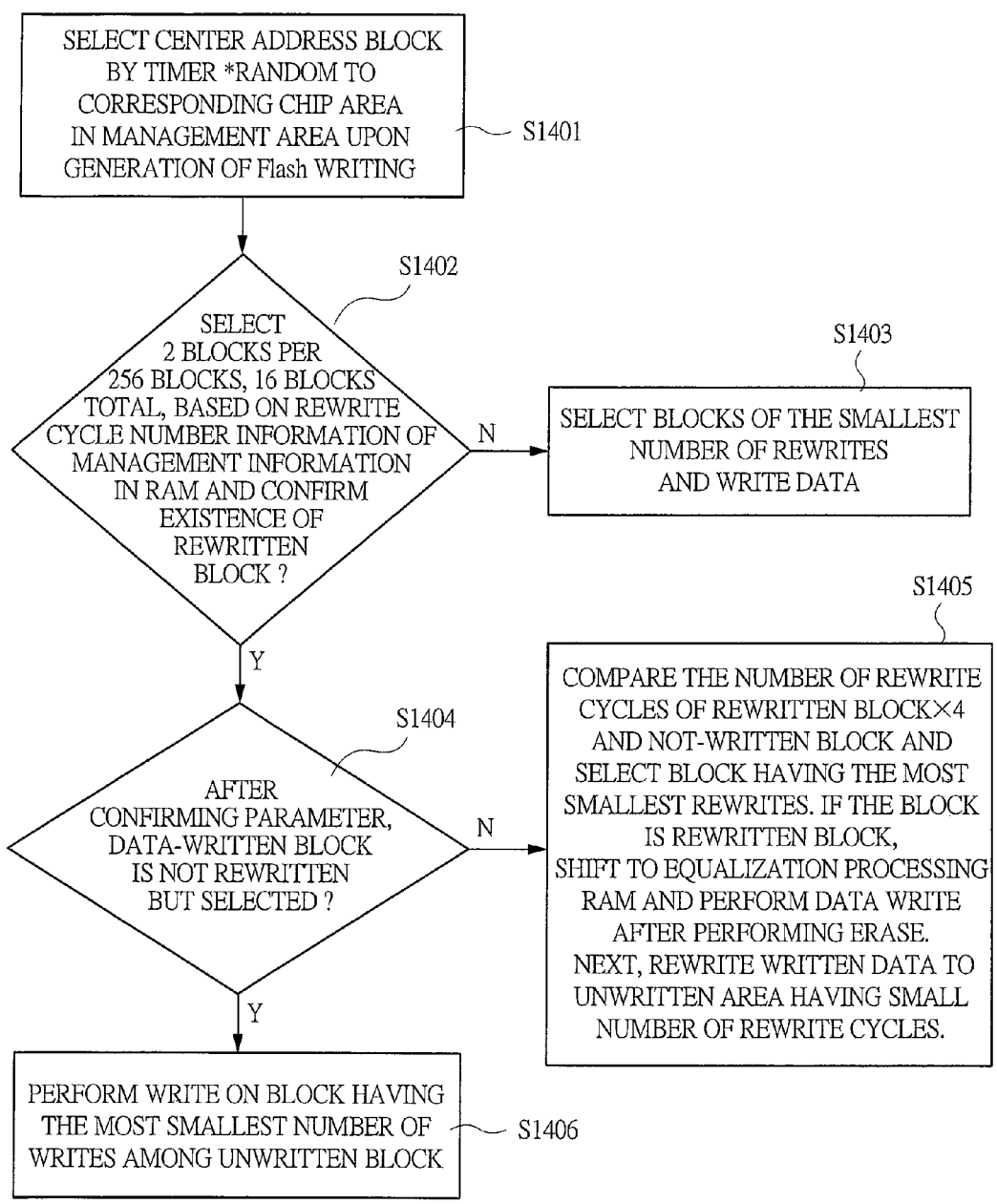
FIG. 14 is a flowchart indicating an example of an operation of a leveling process when a difference in the number of rewrite operations reaches a 4-fold number of cycles in the storage device according to the embodiment of the present invention.

FIG. 14 is a flowchart showing an example of an operation of the leveling process in the case where a 4-fold difference in the number of rewrite cycles is made. At first, when a write is generated in the flash, i.e., the nonvolatile memories 101, an arbitrary block is selected at a step S1401. More specifically, a center address block is selected with (Timer)×(RANDOM) in a relevant chip area in the file management information area. (RANDOM) is an arbitrary random number.

Next, at a step S1402, based on information of the number of rewrite cycles of the file management information in the RAM, i.e., the volatile memory 106, 2 blocks per 256 blocks, a total of 16 blocks, are selected to check whether there is any already-rewritten block or not.

When there is no already-rewritten block, a block with the least number of rewrites is selected at a step S1403 to write the data in the nonvolatile memories 101. When there is an already-rewritten block, a parameter is checked at a step S1404 to check whether "Don't perform rewrite on already-data-written blocks" is selected or not.

When "Don't perform rewrite on already-data-written blocks" is not selected, (the number of rewrite operations of the already-written blocks)×4 is compared to (unwritten blocks) at a step S1405, and a block with the least number of rewrites is selected. The equalization process is performed when the block is an already-written block, and the data is moved to the RAM, i.e., the volatile memory 106 to perform data write after performing erase. Next, the already-written data is written back to an unwritten area with the small number of rewrites.

When "Don't perform rewrite on already-data-written blocks" is selected, write is performed on a block with the least number of rewrites among the unwritten blocks at a step S1406.

Figure 15:
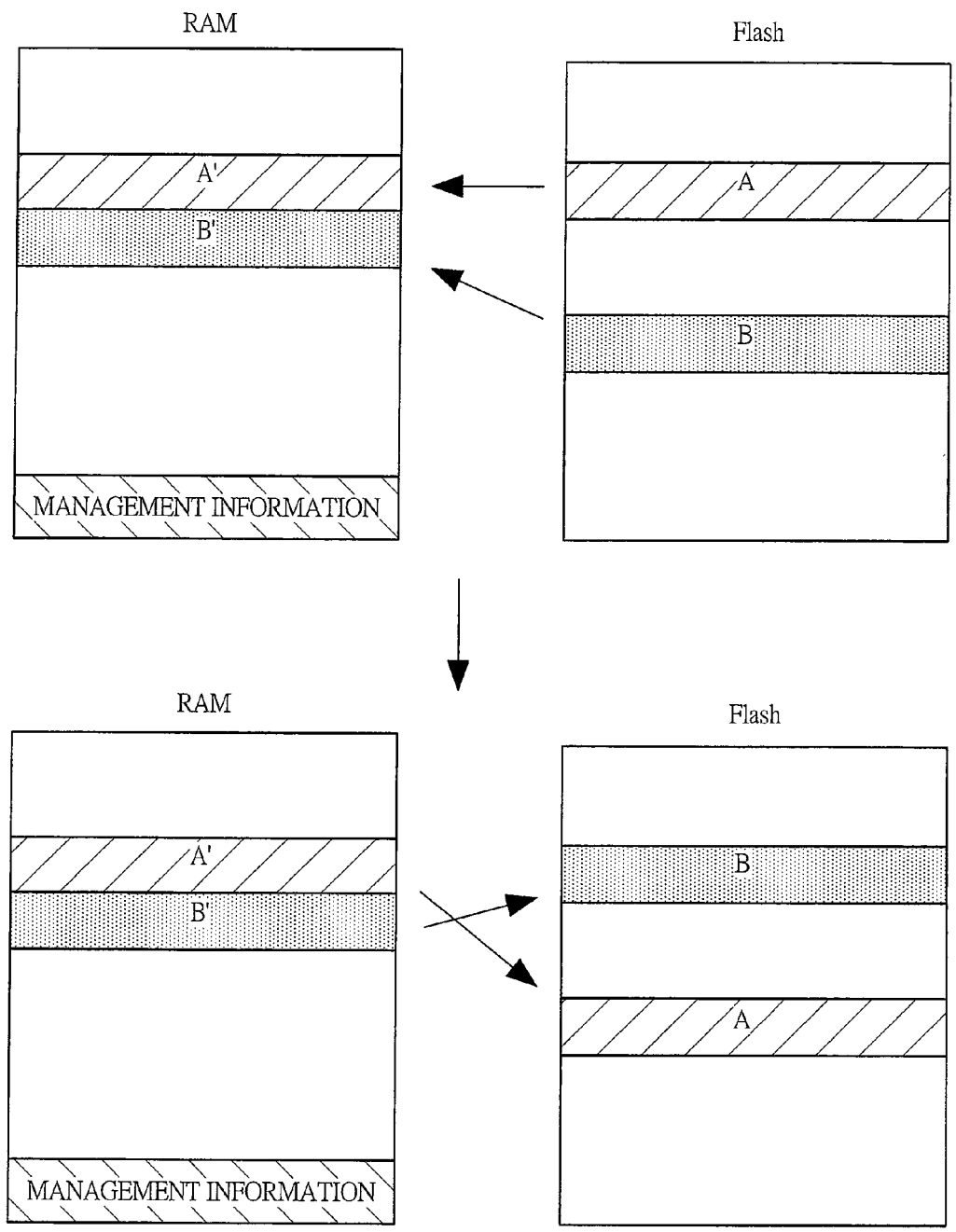
FIG. 15 is an explanatory diagram illustrating an example of the operation of the leveling process in the storage device according to the embodiment of the present invention.

FIG. 15 is an explanatory diagram illustrating an example of the operation of the leveling process. In FIG. 15, the RAM is the volatile memory 106 and the flash is the nonvolatile memory 101.

The leveling process is performed in the following procedure, for example.

(1) When a write (write) is generated from the host 107, the controller 103 looks for the file management information maintained in the RAM.

(2) For example, data A in the flash is moved to a data retention area in the RAM (A→A').

(3) The controller 103 searches 16 rewrite destinations.

(4) Data B in the rewrite destination is moved to the data retention area in the RAM (B→B').

(5) The data B' in the RAM is moved to the location from which the data A has been put in the flash.

(6) The data A' in the RAM is moved to the location from which the data B has been put in the flash.

(7) The file management information in the RAM is updated, and the procedure is ended.

(Data Addition)

When writing data to the nonvolatile memories 101, the controller 103 does not rewrite whole blocks of the nonvolatile memories 101, but adds only the data to add to free pages in the nonvolatile memories 101 in page units, and updates the file management information in the volatile memory 106. By refraining from rewriting whole blocks in the nonvolatile memories 101, the rewrite endurance can be improved. The addition arranges writes on only the latest page at the same address at the stage the block vacancy ratio increases (for example, when 100 KB of 128 KB has been written, and when 56 pages of 64 pages have been written, etc.).

Figure 16:
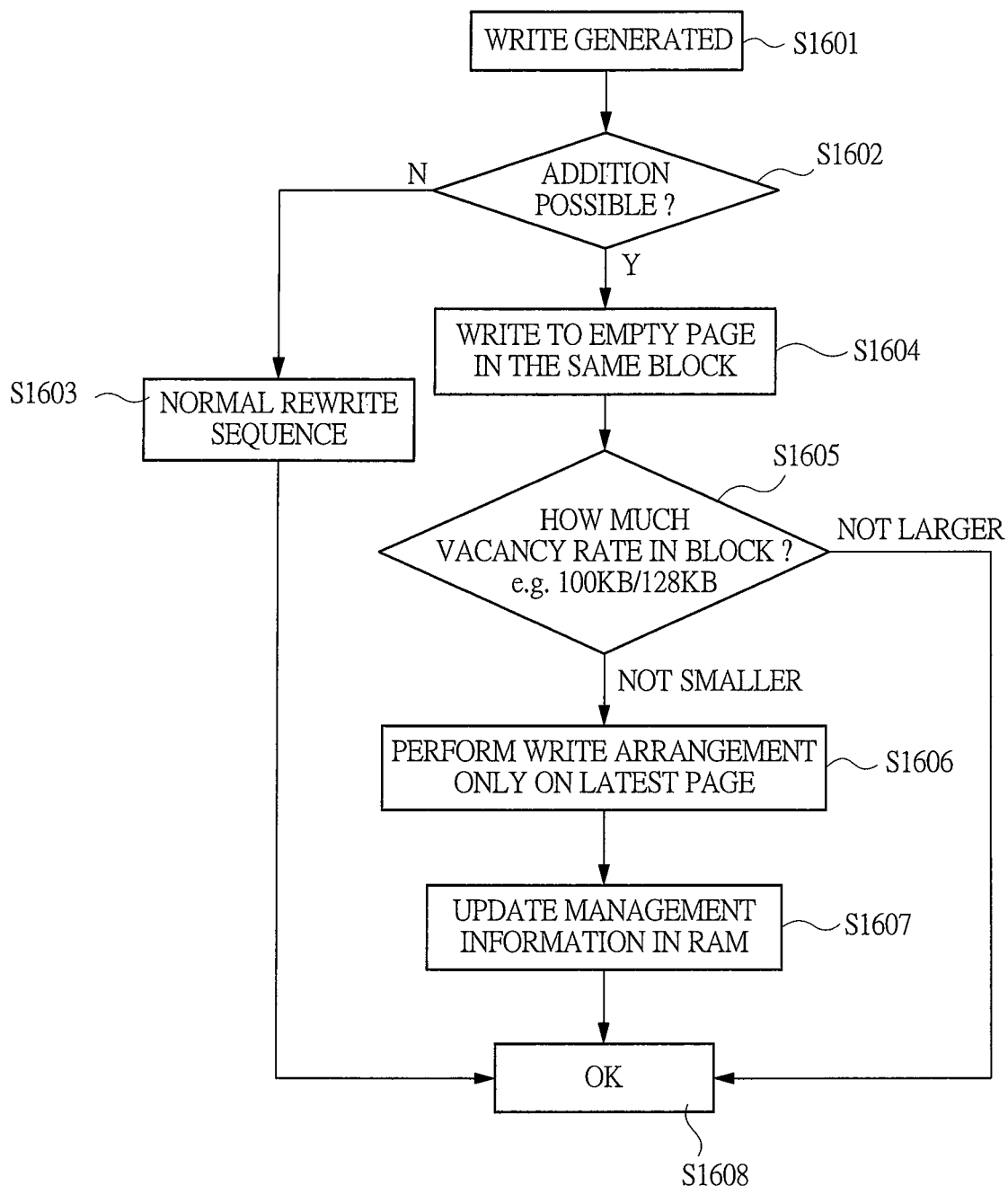
FIG. 16 is a flowchart indicating an example of an operation of data addition in the storage device according to the embodiment of the present invention.

FIG. 16 is a flowchart indicating an example of the operation of data addition in the storage device according to the embodiment of the present invention. At first, when a write (write) is generated at a step 1601, the controller 103 checks whether addition to the nonvolatile memories 101 is possible or not based on the file management information at a step S1602. When the adding operation is not possible, the controller 103 does not perform the addition to the nonvolatile memories 101 at a step S1603, but performs a normal rewrite sequence. When the addition is possible, the controller 103 writes the data in the free pages in the same block of the nonvolatile memories 101 at a step S1604. Then, the vacancy ratio of the block is checked at a step S1605, and when the vacancy ratio is, for example, not less than 100 KB/128 KB, only the latest page has arranged writes thereon at a step S1606. Subsequently, the file management information in the RAM, i.e., the volatile memory 106 is updated at a step S1607. On the other hand, when the vacancy ratio of the block is, for example, 100 KB/128 KB or less, the adding operation is ended at a step S1608.

(Calculation of the Number of Remaining Blocks)

The storage device according to the embodiment of the present invention has a function of outputting the number of remaining blocks. That is, when a request command is received from the host 107, the controller 103 calculates the number of remaining blocks based on the file management information in the volatile memory 106 and returns the result to the host 107. By returning the number of remaining blocks, the host 107 can recognize the lifetime of the nonvolatile memories 101.

(Layout)

Figure 17:
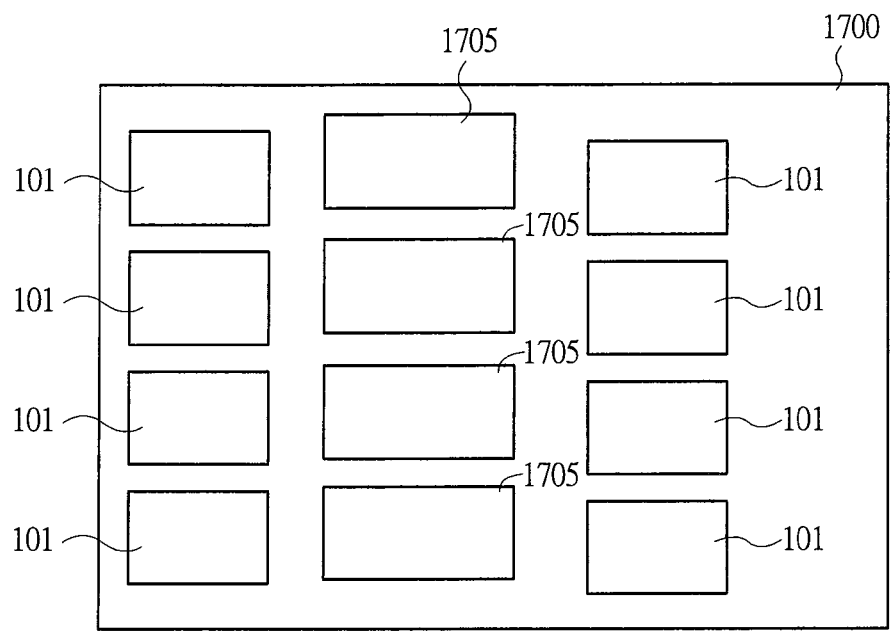
FIG. 17 is a plan view illustrating a layout on a substrate of the storage device according to the embodiment of the present invention.
Figure 18:
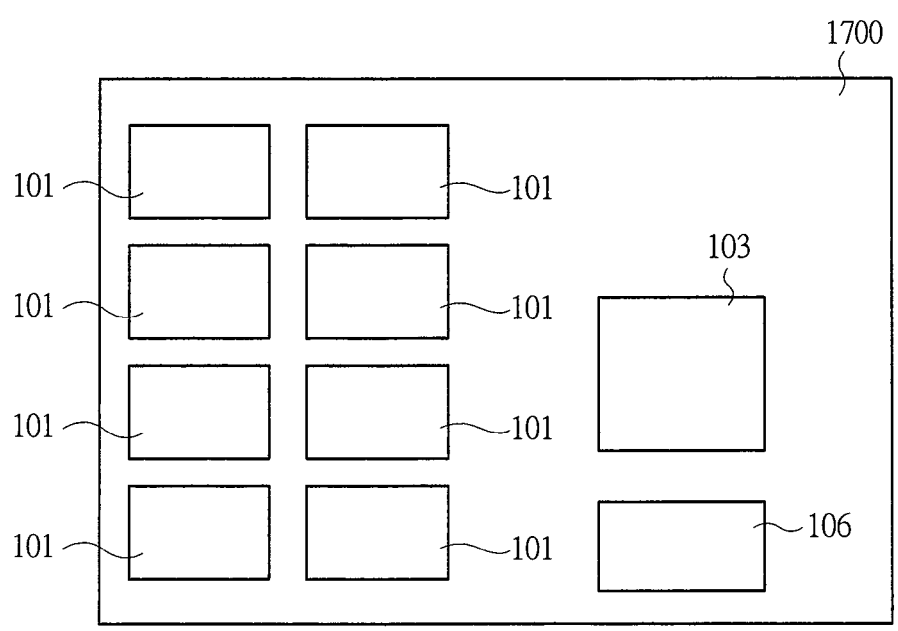
FIG. 18 is a back view illustrating a layout on the substrate of the storage device according to the embodiment of the present invention.

FIG. 17 is a plan view illustrating a layout of a substrate of the storage device according to the embodiment of the present invention, and FIG. 18 is a back view of the same.

The storage device according to the present embodiment has, in its, for example, 2.5 inch (70.0×100.0×9.5 mm) outline, a large capacity capacitor 1705 (the power supply maintaining unit 105) for maintaining power, a flash (the nonvolatile memories 101), the controller 103, and a RAM (the volatile memory 106). As shown in FIG. 17, 8 nonvolatile memories 101 and 4 electric double-layer capacitors making the large capacity capacitor 1705 constituting the power supply maintaining unit 105 are arranged on a surface of a substrate 1700. In addition, as shown in FIG. 18, 8 nonvolatile memories 101, the controller 103, and the volatile memory (RAM) 106 are arranged on the back surface of the substrate 1700.

Also, the capacitor 1705 of the power supply maintaining unit 105 has a structure for keeping vibration resistance by a spacer. The spacer may have a shape to be fixed to the substrate by screwing, etc., or a shape to be inserted into the substrate without fixing.

Figure 19:
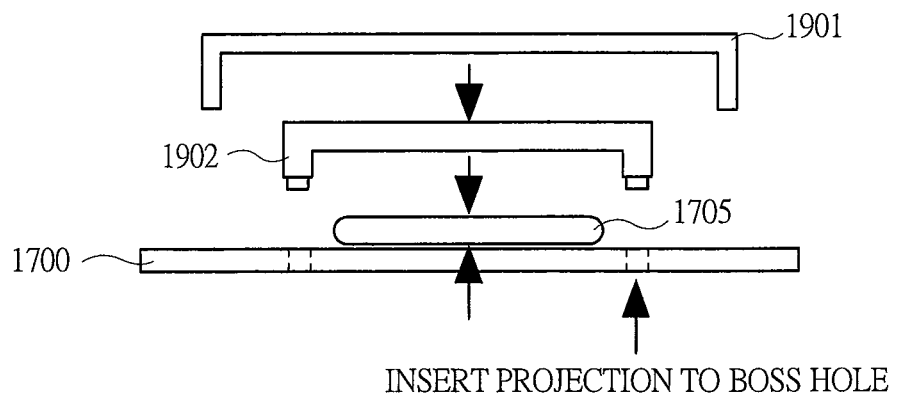
FIG. 19 shows an example of fixing a capacitor by a spacer in the storage device according to the embodiment of the present invention.
Figure 19:
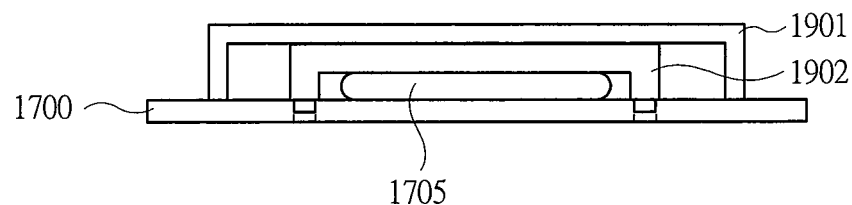
Figure 20:
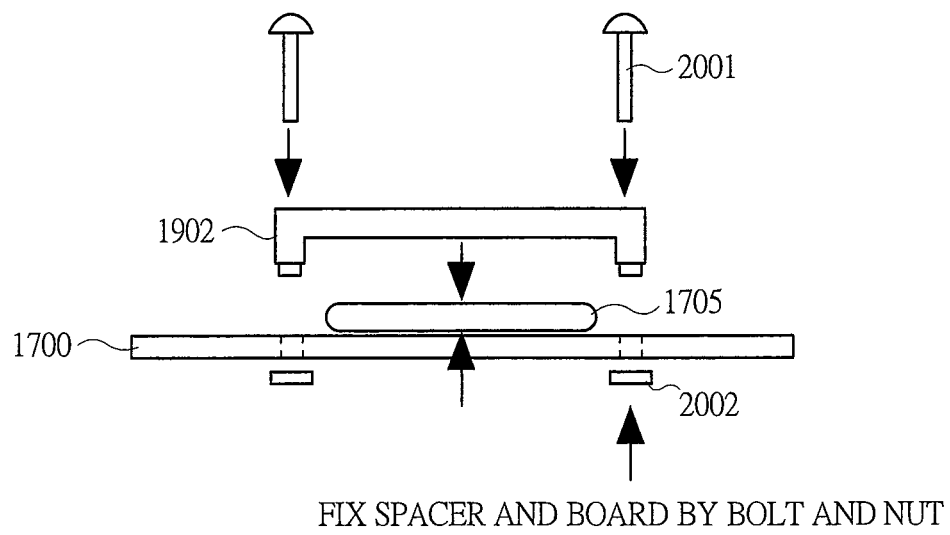
FIG. 20 shows an example of fixing the capacitor by the spacer in the storage device according to the embodiment of the present invention.

FIGS. 19 and 20 are examples of fixing the capacitor by the spacer. FIG. 19 illustrates an example to sandwich the capacitor 1705 using the substrate 1700, an outer casing 1901, and a spacer 1902. FIG. 20 illustrates an example to sandwich the capacitor 1705 using screws 2001, the spacer 1902, the substrate 1700, and nuts 2002. Projections of the spacer 1902 are inserted into boss holes of the substrate 1700 to be fixed. A material of the spacer 1902 includes a liquid crystal resin, polycarbonate, a non-conductive material, etc. By employing such a structure, the vibration resistance characteristic of the capacitor is improved.

While the invention made by the inventors of the present invention has been concretely described based on the embodiment in the foregoing, the present invention is not limited to the foregoing embodiment, and various modifications and alterations can be made within the scope of the present invention.

For example, as the nonvolatile memories 101, other than the above-described flash (flash memory), a nonvolatile memory that is electrically erasable can be used. An address to be used when loading a fixed amount of data from the initial address 0 h of the nonvolatile memory to the volatile memory at start-up may be any address such as 100 h (128 KB), etc. suited to the file system other than the above-mentioned 20 h. The package may also be applied to a smaller and thinner card-shaped one in addition to the casings having the same outer size as HDDs.

INDUSTRIAL APPLICABILITY

The present invention can be widely used as a storage device employing a file system using a nonvolatile memory.

The invention claimed is:

1. A semiconductor storage device connectable to a host, the storage device comprising:
   a package;
   a controller disposed in said package and having an interface circuit configured to control data input and output between the host and the storage device so that the semiconductor storage device is operated as a drive compatible to a hard-disk-drive as viewed from the host;

a first memory unit configured with flash memories disposed in said package and configured to provide a file management information section, which is configured to store file management information of an operating system for the host, and a data section configured to store data sent from the host in the data section, wherein the file management information is to be referred to when the host accesses the data section;

a second memory unit configured with one of static and dynamic random access memories disposed in said package; and a power supply maintaining unit disposed in said package and including an electric capacitor having a capacity of at least 0.1 F, wherein, while the host is under a normal operation, the semiconductor storage device is driven by electric power supplied by the host, and the electric capacitor is charged by the electric power supplied by the host, and wherein the controller is configured to:

(1) read file management information from the first memory unit configured with flash memories and write the same in the second memory unit configured with one of static and dynamic random access memories in response to startup of the host;

(2) perform read and write operations from the host to the storage device by referring to the file management information stored in the second memory unit configured with the random access memories instead of the file management information in the first memory unit configured with flash memories, and update the file management information within the second memory unit configured with the random access memories during normal operations of the host when an access of read or write from the host to the storage device is observed;

(3) read the updated file management information in the second memory unit configured with the random access memories and write the same in the first memory unit configured with flash memories in response to a normal shutdown operation in the host; and (4) when an unexpected power shutdown occurs on the host side, switch power supply connection from the host to the power supply maintaining unit and control to cut off a signal from the host and read the updated file management information in the second memory unit configured with the random access memories and write the updated file management information in the first memory unit configured with flash memories with electric power supplied from the power supply maintaining unit.

2. A semiconductor storage device connectable to a host, the storage device comprising:

a controller having an interface circuit configured to control data input and output between the host and the storage device so that the semiconductor storage device is operated as drive compatible to a hard-disk-drive as viewed from the host;

a first memory unit configured with flash memories configured to provide a file management information section, which is configured to store file management information of an operating system for the host, and a data section configured to store data sent from the host in the data section, wherein the file management information is to be referred to when the host accesses the data section;

a second memory unit configured with one of static and dynamic random access memories;

a power supply maintaining unit including an electric capacitor having a capacity of at least 0.1 F, wherein, while the host is under a normal operation, the semiconductor storage device is driven by electric power supplied by the host, and the electric capacitor is charged by the electric power supplied by the host; and one of a package and a card type substrate on which all of said controller, said first memory unit, said second memory unit are assembled as a drive unit so as to constitute a hard disk drive-compatible storage device, wherein the controller is configured to:

(1) read file management information from the first memory unit configured with flash memories and write the same in the second memory unit configured with one of static and dynamic random access memories in response to startup of the host;

(2) perform read and write operations from the host to the storage device by referring to the file management information stored in the second memory unit configured with the random access memories instead of the file management information in the first memory unit configured with flash memories, and update the file management information within the second memory unit configured with the random access memories during normal operations of the host when an access of read or write from the host to the storage device is observed;

(3) read the updated file management information in the second memory unit configured with the random access memories and write the same in the first memory unit configured with flash memories in response to a normal shutdown operation executed on the host; and (4) when an unexpected power shutdown occurs on the host side, switch power supply connection from the host to the power supply maintaining unit and control to cut off a signal from the host and read the updated file management information in the second memory unit configured with the random access memories and write the updated file management information in the first memory unit configured with flash memories with electric power supplied from the power supply maintaining unit.

* * * * *